United States Patent Office 3,047,557
Patented July 31, 1962

3,047,557
PROCESS FOR POLYMERIZING OLEFINS WITH CATALYSTS OF TiCl₃ DIALKYL ALUMINUM FLUORIDES IN COMBINATION WITH ANOTHER DIALKYL ALUMINUM HALIDE
Kurt Rust, Ernst Junghanns, Siegfried Sommer, and Gerhard Bier, all of Frankfurt am Main, Germany, assignors to Farbwerke Hoechst Aktiengesellschaft vormals Meister Lucius & Bruning, Frankfurt am Main, Germany, a corporation of Germany
No Drawing. Filed Oct. 14, 1958, Ser. No. 767,085
Claims priority, application Germany Oct. 19, 1957
6 Claims. (Cl. 260—93.7)

The present invention relates to a process for polymerizing olefins.

It is known to polymerize alpha-olefins and diolefins, especially ethylene, propylene, butene-1, butadiene and isoprene, in the presence of so-called Ziegler catalysts, i.e. catalysts prepared from compounds of the elements of groups IV to VIII of the periodic table, particularly titanium, and compounds of reducing and/or alkylating action, particularly those of groups I to III of the periodic table, preferably aluminum, at low pressures and temperatures to yield valuable thermoplastic synthetic resins. Such Ziegler catalysts are described by Raff and Allison, "Polyethylene" (1956), pages 72 to 81, especially pages 78 to 81.

It is also known that the polymerization of propylene and higher alpha-olefins in the presence of Ziegler catalysts yields amorphous readily soluble polymers and oil in addition to well crystalline polymers which are insoluble or difficultly soluble in hydrocarbons. According to Natta, the well crystallizing polymers contain an especially steric configuration and are called "isotactic," whereas the amorphous polymers do not contain such an especially steric configuration and are called "atactic."

To enable isotactic polymers which are especially valuable artificial materials, to be manufactured on a large scale in an economical manner, Ziegler catalyst systems of a selective action had to be developed which rendered it possible to exclusively or almost exclusively obtain the desired well crystallizing products.

According to Natta, selective catalyst systems of this kind are, for example, obtained from aluminum triethyl and TiCl₃ which has been prepared in the hot from TiCl₄ and H₂ (cf. Natta et al. Gaz. Chim. Ital. 87, Fasc. V 528, 549, 570 (1957)). A simpler method uses the reduction of TiCl₄ with organo-aluminum compounds according to Ziegler, for example aluminum ethyl sesquichloride (designated hereinafter "sesquichloride") or aluminum diethyl monochloride (designated hereinafter "monochloride"). In general, these processes yield catalysts which are little selective in the polymerization of olefins (cf. Natta indicated above).

A catalyst which has not been separated from the mother liquor has a lower activity than a catalyst which has been separated and washed out. Experience has shown that especially alkyl aluminum dihalides, for example aluminum ethyl dichloride (designated hereinafter "dichloride") which forms as a secondary product in the reaction, diminishes the polymerization speed. The dichloride can be removed by washing with an inert solvent. Another method of removing the dichloride is to bind it by means of a complex-forming substance such as NaCl, thereby neutralizing it. The starting materials for this process, for example TiCl₄ and aluminum alkyl compounds, especially sesquichloride and, if desired, NaCl, are technically easily accessible.

The activity and especially the selectivity of these catalyst systems can be increased by subjecting the reaction product of TiCl₄ with an organo-aluminum substance to a thermal treatment carried out for example for 2 to 5 hours at 100° C., if desired in combination with the inactivation of the dichloride by complex-forming substances. For the polymerization these catalysts are activated with monochloride. This mode of proceeding is described in prior U.S. patent application Serial No. 730,067 filed on April 22, 1958. As disclosed on page 5 of that application, the Ziegler catalyst components are reacted prior to polymerization at a temperature of from −20 to +40° C. and the reaction products are subsequently annealed at a temperature ranging from 40–150° C. The reduced metal compound thus formed is described as an organically prepared titanium trichloride. As pointed out on pages 6 and 7 of that specification, titanium trichloride may be washed with an inert dispersing medium such as toluene, xylene, cyclohexane, heptane, isooctane, etc., either prior to annealing, subsequent to annealing, or during the process of annealing.

In the case of these catalyst systems which are prepared according to this earlier proposal which does not belong to the prior art, the nature of the activating agent has a decisive effect upon the polymerization. When sesquichloride, a mixture of mono- and dichloride, is used, the speed of polymerization is very low since the dichloride interferes with the polymerization. When the dichloride contained in the sesquichloride is bound before or during the polymerization by a complex-forming substance such as NaCl, a good activity and selectivity corresponding to those obtained with mono-chloride are obtained even with the sluggish sesquichloride.

An essentially increased activity is obtained when aluminum trialkyl compounds are used as activators. With the use of this combination, however, isotactic polymers cannot be produced in an economical manner since a great portion of amorphous polymers forms at the same time. When aluminum dialkyl monofluorides are used as activators the catalysts behave in a similar manner.

The present invention is based on the observation that alpha-olefins containing 3–10 carbon atoms can be polymerized in the presence of Ziegler catalysts at a high polymerization speed, while obtaining a high fraction of isotactic polymers, by activating the heavy metal components of Ziegler catalysts which have been developed for a stereospecific polymerization of alpha-olefins, with a mixture of activators which in addition to metal alkyl halides contain metal alkyl fluorides, the atomic weight of the halogen being greater than 35, and the ratio of metal alkyl halide (atomic weight above 35) to metal alkyl fluoride being within the range of 9:1 to 1:1.

The activator mixtures according to the invention may be prepared, for example, by reacting metal alkyl halides (the term "metal" being used herein to mean a metal of group III of the periodic table, for example Al or Ga, and "alkyl" means lower alkyl radicals with 1 to 6 carbon atoms and "halide" means halogen atoms with an atomic weight greater than 35) under appropriate conditions with fluorides which readily exchange the fluorine for chlorine, bromine or iodine. Fluorides of this kind are, for example, alkali or alkaline earth fluorides or heavy metal fluorides such as PbF₂.

It is of no importance for the polymerization whether the reaction mixture of metal alkyl halide and fluoride is separated from the insoluble salts contained therein or the total suspension is used for the activation. It is therefore also possible to mix the isolated dialkyl metal halides and fluorides in an appropriate proportion and to use the resultant mixture as an activator.

A simpler method is to react metal dialkyl monohalides or metal alkyl sesquihalides with fluorides which readily exchange fluorine for chlorine, bromine or iodine, applying such temperatures and conditions that only part of the chlorine, bromine or iodine is exchanged for fluorine.

According to an especially advantageous method, the activation is carried out with the solution or suspension of the reaction product of the technically easily accessible metal alkyl sesquihalides with a mixture of fluorine-containing salts which readily exchange fluorine for halogen, for example alkali fluorides, and salts which form complex salts with the metal monoalkyl dihalides. By reacting, for example, aluminum alkyl sesquichloride with NaCl and NaF in a ratio of 2:1:1 to 2:1:1.34, a suitable mixture of aluminum dialkyl fluoride and aluminum dialkyl chloride is obtained.

In another form of the process of the invention, the metal alkyl halides (Cl, Br, I) to be reacted are only prepared during the reaction with the fluorides by reacting metal trialkyl compounds with chlorides, bromides or iodides of the metal of the trialkyl compound and fluorides. By reacting, for example, aluminum triethyl with aluminum chloride or aluminum sesquichloride and sodium fluoride, a very suitable polymerization activator is obtained.

It could not be foreseen that by using fluorine-containing activators together with those containing chlorine, bromine or iodine, the polymerization speed could be increased—as compared with polymerizations using, for example, aluminum dialkyl monochloride as an activator—without the stereospecificity (isotactic fraction of the polymer) being reduced.

When the activation is carried out, for example, with aluminum monoalkyl fluorides only, a higher polymerization speed is obtained but the stereospecificity is reduced.

The mixtures of, for example, aluminum dialkyl monohalides and aluminum dialkyl monofluorides, may be prepared with or without the use of an inert solvent (see below).

The reaction of, for example, aluminum dialkyl monohalides (chloride, bromide or iodide) or aluminum alkyl sesquihalides with fluorine-containing salts is advantageously carried out in an inert solvent (see below). The fluorine-containing salts must be capable of readily exchanging the fluorine atom for chlorine, bromine or iodine. Salts of this kind are, as already mentioned above, alkali fluorides, alkaline earth fluorides and heavy metal fluorides such as $PbF_2$.

As inert solvents there may be used desulfurized, well dried petroleum fractions which are free from oxygen and olefins and have a boiling range of for example 80 to 250° C. Alternatively, aromatic substances such as toluene, xylene and diethylbenzene or alicyclic substances such as cyclohexane and methylcyclohexane may be used with similar good results.

The properties exhibited in the polymerization of olefins by the activators obtained by the reaction of fluorides with aluminum dialkyl halides or aluminum alkyl sesquihalides depend to a high degree on the conditions of concentration, temperature and time of heating prevailing during their manufacture and on the proportion of the organometal compound to the fluoride. If the concentration is very low and the reaction temperature is too low, for example below 20° C., no interchange worth mentioning takes place between the fluorine and the halogen. If the quantity of fluoride is too great, the optimum mixing proportion (metal dialkyl monohalide (chloride, bromide, iodide): metal dialkyl monofluoride=about 1:1) is exceeded whereby the amorphous portion or fraction of polymer is increased in the course of the polymerization.

As substances used for binding the monoalkyl dihalides in the alkyl sesquihalides there may advantageously be used alkali or alkaline earth halides, preferably NaCl, or other complex-forming salts or organic substances capable of forming complex compounds such as diphenyl ether. The complex forming substance may be added together with the fluoride before the heating process or the complex-forming substance and the fluoride may be heated together with the sesquichloride. When the complex-forming substance is NaCl and the fluoride component is NaF, the ratio of sesqui:NaCl:NaF is preferably 2:1:1 to 2:1:1.34 as indicated above.

The polymerization of the olefins of the type $H_2C=CHR$, wherein R represents hydrogen or an alkyl radical containing up to 8 carbon atoms, especially $$-CH_3, -C_2H_5, -C_3H_7 \text{ or } -CH_2-CH-$$

may be carried out continuously or discontinuously under atmospheric pressure or a slightly superatmospheric pressure of, for example, 1 to 30 atmospheres (gauge), in the presence of Ziegler catalysts developed for the stereospecific polymerization and in the presence of the activators described above. The catalyst and the activator may either be introduced first before the polymerization reaction sets in or the catalyst and/or the activator may be wholly or partially added during the polymerization. The polymerization may be carried out in the inert solvents indicated above and/or in the liquid monomer. The polymerization temperature depends on the monomer but should not exceed 150° C.

The following examples serve to illustrate the invention but they are not intended to limit it thereto.

EXAMPLE 1

Into a 3.51 liter vessel provided with a stirrer, a gas inlet tube and a gas outlet tube, 2.0 liters of a mixture of saturated hydrocarbons boiling between 200 and 220° C. and which have been thoroughly freed from water and oxygen were introduced as a solvent for the monomer and as a dispersing agent for the catalyst and the polymer. Under a nitrogen atmosphere there were added at 50° C. first the activators indicated in Table 1 given below and then the stereospecific $TiCl_3$ catalyst (obtained, for example, according to the above mentioned U.S. patent application Ser. No. 730,067. Said stereospecific $TiCl_3$ catalyst can be prepared as in Example 1 of Serial No. 730,067 by the steps of reacting $TiCl_4$ with aluminum diethyl monochloride at a temperature of 0° C., aging the precipitate which forms, separating the latter and washing it with a hydrogenated diesel oil fraction having a boiling point of 200–220° C., and then heating the catalyst suspension at 90° C. after which it is cooled and washed again with said diesel oil fraction. Example 2 of Serial No. 730,067 discloses preparing a trivalent titanium chloride from the same components but dispensing with the step of washing with an inert solvent. A similar process is shown in Example 5 of that application wherein $TiCl_4$ is reacted with ethyl aluminum sesquichloride at a temperature of about 0° C., the precipitate which is formed is separated from the mother liquor and washed with a petroleum fraction boiling between 200–250° C., after which the titanium trichloride suspension is stirred under nitrogen for 3 hours at 100° C. to anneal the titanium trichloride; the dispersion is then suction filtered and washed with the petroleum fraction and then suspended again therein. This aforesaid process of preparing the stereospecific $TiCl_3$ catalyst is typical of the processes which could be used in the present catalyst preparation.

Propylene was then added at 50° C. under atmospheric pressure. After 5 hours, 40 milliliters of butanol were added and the whole was repeatedly washed with 500 milliliters of water. The polymer which was insoluble in the dispersing agent was suction-filtered, distilled with steam and dried. After a vacuum distillation, the soluble portion was determined by means of the filtrate.

The insoluble polymer is characterized by its reduced viscosity (measured in a 0.5% solution in tetrahydronaphthalene at 130°).

As activator Al(C₂H₅)₂Cl together with Al(C₂H₅)₂F (both prepared according to Ziegler and Köster, A. 608, page 1 et seq.) was used. The following table shows that an optimum result was obtained with a mixing proportion of 1:1.

Table 1

| Activator | Insoluble polypropylene | | |
|---|---|---|---|
| | g./g. TiCl₃/hr. | Percent | η red |
| 20 millimols Al(C₂H₅)₂Cl, 0 millimols Al(C₂H₅)₂F | 6 | 96.5 | 7.70 |
| 15 millimols Al(C₂H₅)₂Cl, 5 millimols Al(C₂H₅)₂F | 6.3 | 97.5 | 9.96 |
| 10 millimols Al(C₂H₅)₂Cl, 10 millimols Al(C₂H₅)₂F | 12.5 | 96 | 10.6 |
| 5 millimols Al(C₂H₅)₂Cl, 15 millimols Al(C₂H₅)₂F | 16.5 | 88 | 9.30 |
| 0 millimols Al(C₂H₅)₂Cl, 20 millimols Al(C₂H₅)₂F | 16.5 | 76 | 9.26 |

EXAMPLE 2

(a) *Preparation of the activator.*—To 40 millimols of Al(C₂H₅)₂Cl which had been dissolved in saturated hydrocarbons boiling between 200 and 220° C. to yield a 30% solution, thoroughly dried fluoride was added with the exclusion of air and moisture, while stirring. The quantities of fluoride added were as indicated in the table given below. On the addition of the fluoride the temperature rose from 20° C. to a maximum temperature of 60° C. The whole was heated for 30 minutes at 90° C., and the suspension was then used for activating the polymerization.

(b) *Polymerization.*—The polymerization was carried out as described in Example 1. 20 millimols of TiCl₃ were used.

Table 2

| Activator | Insoluble polypropylene | | |
|---|---|---|---|
| | g./g. TiCl₃/hr. | Percent | η red |
| 40 millimols Al(C₂H₅)₂Cl | 7.5 | 97 | 9.54 |
| 40 millimols Al(C₂H₅)₂Cl+20 millimols NaF | 11.5 | 97.5 | 13.6 |
| 40 millimols Al(C₂H₅)₂Cl+40 millimols NaF | 13.5 | 97.5 | 14.0 |
| 40 millimols Al(C₂H₅)₂Cl+40 millimols LiF | 14.0 | 97 | 10.0 |
| 40 millimols Al(C₂H₅)₂Cl+40 millimols KF | 13.8 | 96.5 | 12.2 |
| 40 millimols Al(C₂H₅)₂Cl+20 millimols CaF₂ | 12.0 | 96.5 | 11.3 |
| 40 millimols Al(C₂H₅)₂Cl+20 millimols PbF₂ | 10 | 98 | 10 |
| 40 millimols Al(C₂H₅)₂Cl+13 millimols SbF₃ | 8 | 95 | 9.8 |

EXAMPLE 3

(a) *Preparation of the activator.*—In a 2 liter four-neck flask provided with a stirrer, a reflux condenser, a thermometer and a nitrogen atmosphere, 89 cc. (=400 millimols) of diethylaluminum sesquichloride were added within 2 minutes at 20° C., with thorough exclusion of atmospheric oxygen and water, to a suspension of 911 cc. of a mixture of saturated hydrocarbons boiling at 200 to 220° C. and 16.8 grams (=400 millimols) of well dried sodium fluoride. The whole was then heated for two hours at 90° C. After cooling, the top layer was siphoned off the depositing solidifying oil.

(b) *Polymerization.*—The polymerization of propylene was carried out as described in Example 1. 40 millimols=100 cc. of the activator described above sub item (a) and 20 millimols of TiCl₃ catalyst were used. The yield of crystalline isotactic polymer was 351 grams which corresponded to 22.8 g./g. TiCl₃/hr. The yield of oily and amorphous product amounted to 2.8% calculated upon the total of polymers. The molecular weight expressed in η red. was η red=13.81 (measured in a 0.5% solution in tetrahydronaphthalene at 130° C.).

EXAMPLE 4

(a) *Preparation of the activator (aluminum ethyl sesquichloride:NaCl:NaF=2:1:1).*—Into a 4 liter four-neck flask provided with a stirrer, a reflux condenser and a nitrogen atmosphere there were introduced 1946 cc. of a saturated hydrocarbon boiling at 200 to 220° C. and 91 grams of NaCl=1.557 mols which had been dried for 4 hours at 200° C. in a high vacuum. (In another case, the NaF was already introduced together with the NaCl, before the polymerization reaction set in; a similar good result was obtained.) At an internal temperature of 20° C., 700 cc. of diethylaluminum sesquichloride=3.114 mols (mono:di=50:50) were then added dropwise within 10 minutes, while stirring and cooling. After removal of the cooling bath, the solution was heated at 70 to 90° C. until the solution was clear and 2 layers (oil (=complex of dichloride and NaCl) and saturated hydrocarbon/monochloride) had formed. At about 70° C., 65.8 grams of NaF=1.557 mols were added, whereupon the temperature rose to 90 to 100° C. The whole was kept at 90° C. for 30 minutes. The activator solution was siphoned off the oil at 65 to 70° C. in one case while, in another case, the oily layer was allowed to solidify and the activator solution was separated from the solid residue. The salt residue could be removed without difficulty by melting and by means of a siphon. About 7.5 cc. of the solution corresponded to 10 millimols of diethylaluminum halide.

(b) *Polymerization*—The polymerization of propylene was carried out as described in Example 1. 40 millimols of activator and 10 millimols of TiCl₃ catalyst were used. The results obtained with activators showing different proportions of sesquichloride:NaCl:NaF are indicated in the following table.

Table 3

| Activator ratio of sesquichloride: NaCl:NaF | Insoluble crystalline polypropylene | | |
|---|---|---|---|
| | g./g. TiCl₃/hr. | Percent | η red |
| 2:1:0.5 | 10.4 | 91 | 6.7 |
| 2:1:1 | 26 | 97 | 11.0 |
| 2:1:1.14 | 27 | 96 | 12.8 |
| 2:1:1.34 | 33.3 | 94 | 12.6 |
| 2:1:1.5 | 35 | 92 | 13.7 |
| 2:1:2 | 34.5 | 83 | 11.5 |
| Diethyl aluminum monochloride | 13 | 94 | 6.8 |

EXAMPLE 5

(a) *Preparation of the activator.*—In a 250 cc. four-neck flask, a mixture of 2.82 cc. (=20 millimols) of aluminum triethyl and 4.46 cc. (=20 millimols) of diethylaluminum sesquichloride was added at 25° C. to a suspension of 150 cc. of a saturated hydrocarbon boiling between 200 and 220° C. and 1.68 grams (=40 millimols) of dry sodium fluoride and the whole was then heated for 30 minutes at 90° C. The suspension was used for the polymerization, without the salt being previously separated.

(b) *Polymerization.*—The polymerization of propylene was carried out as described in Example 1. 20 millimols of TiCl₃ catalyst and 40 millimols of activator were used. 280 grams of crystalline polypropylene were obtained which corresponded to 18.2 g./g. TiCl₃/hr. The yield of soluble and amorphous polymer was 6 grams=2.1%. The molecular weight expressed in η red was 12.6.

EXAMPLE 6

(a) *Preparation of the activator.*—In a four-neck flask provided with a reflux condenser, a stirrer, a nitrogen atmosphere and a thermometer, 3.76 cc. (=26.66 millimols) of aluminum triethyl were added to a suspension of 100 cc. of a saturated hydrocarbon boiling at 200 to 220° C. and 1.78 grams (=13.33 millimols) of dry sublimate aluminum trichloride and 1.68 grams (=20 millimols) of dry aluminum trifluoride. The whole was then heated for 2 hours at 90° C. The suspension was used for the polymerization, without the salt being previously separated.

(b) *Polymerization.*—The polymerization of propylene was carried out as described in Example 1. 20 millimols of $TiCl_3$ and 40 millimols of activator were used. The yield of crystalline polypropylene amounted to 20 g./g. $TiCl_3$/hr. ($\eta$ red=14.2).

EXAMPLE 7

The polymerization was carried out at 30° C. in the manner described in Example 1 with the exception that butene-1 was used as a monomer.

*Table 4*

| Activator | g./g. $TiCl_3$/hr. | Percent | $\eta$ red |
|---|---|---|---|
| 40 millimols $Al(C_2H_5)_2Cl$ | 14.3 | 97 | 6.7 |
| 20 millimols $Al(C_2H_5)_2Cl$ + 20 millimols $Al(C_2H_5)_2F$ | 19.5 | 98 | 9.3 |

NOTE.—The reduced viscosities were measured in a 0.1% solution in decahydronaphthalene at 135° C.

EXAMPLE 8

Styrene was polymerized under the conditions described in Example 1 with 20 millimols of $TiCl_3$ and 40 millimols of activator (prepared as described in Example 4). The extent of conversion amounted to 97%. The polymer obtained was almost completely crystalline.

We claim:
1. An improved process for the preparation of isotactic polypropylene which comprises contacting propylene with $TiCl_3$ under atmospheric pressure, the $TiCl_3$ being activated by adding to the system a 1:1 mixture of aluminum diethyl chloride and aluminum diethyl fluoride, and recovering polypropylene having an isotactic content exceeding 90%.

2. In a process for the preparation of a polyolefin by contacting an alpha-olefin of the formula $CH_2=CHR$, wherein R is selected from the group consisting of an alkyl of 1 to 8 carbon atoms and phenyl, with a solid catalyst prepared by reacting $TiCl_4$ with an alkyl-aluminum halide at a temperature of −20 to 40° C. to form a partially reduced titanium chloride, said catalyst being tempered at a temperature of 40 to 150° C. and subsequently washed with an inert solvent, the improvement comprising activating the aforesaid solid catalyst with a mixture of a dialkyl aluminum monofluoride and a dialkyl aluminum monohalide in which the halogen has an atomic weight greater than 35, the molar ratio of said dialkyl aluminum monohalide to the dialkyl aluminum monofluoride being within the range of 1:1 to 9:1, and thereby forming a polymer having an isotactic content in excess of 90%.

3. The process of claim 2 wherein the said alpha-olefin is propylene.

4. The process of claim 2 wherein the said alpha-olefin is n-butene.

5. The process of claim 2 wherein the polymer prepared is a copolymer of lower olefins containing up to 10 carbon atoms.

6. The process of claim 2 wherein the activator mixture comprises an aluminum dialkyl fluoride and an aluminum dialkyl chloride.

References Cited in the file of this patent

UNITED STATES PATENTS

| 2,827,446 | Breslow | Mar. 18, 1958 |
| 2,840,551 | Field et al. | June 24, 1958 |
| 2,843,577 | Friedlander et al. | July 15, 1958 |
| 2,893,984 | Seelbach et al. | July 7, 1959 |
| 2,914,520 | Vandenberg | Nov. 24, 1959 |
| 2,939,846 | Gordon et al. | June 7, 1960 |

FOREIGN PATENTS

| 785,314 | Great Britain | Oct. 23, 1957 |